US011494783B2

(12) United States Patent
Elshishiny et al.

(10) Patent No.: US 11,494,783 B2
(45) Date of Patent: Nov. 8, 2022

(54) DISPLAY AND SHELF SPACE AUDIT SYSTEM

(71) Applicant: International Business Machines Corporation, Armonk, NY (US)

(72) Inventors: Hisham E. Elshishiny, Cairo (EG); Sivananthan Perumal, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 432 days.

(21) Appl. No.: 15/408,536

(22) Filed: Jan. 18, 2017

(65) Prior Publication Data

US 2018/0204219 A1      Jul. 19, 2018

(51) Int. Cl.
*G06Q 30/04* (2012.01)
*H04N 1/32* (2006.01)
*G06Q 30/00* (2012.01)

(52) U.S. Cl.
CPC ........ *G06Q 30/018* (2013.01); *G06Q 30/04* (2013.01); *H04N 1/32272* (2013.01); *G06Q 2220/10* (2013.01)

(58) Field of Classification Search
None
See application file for complete search history.

(56) References Cited

U.S. PATENT DOCUMENTS

| 6,725,240 | B1* | 4/2004 | Asad | G06F 21/64 |
| 7,366,675 | B1* | 4/2008 | Walker | G06Q 10/109 |
| | | | | 705/2 |
| 7,374,096 | B2* | 5/2008 | Overhultz | G06Q 30/02 |
| | | | | 235/383 |
| 7,693,757 | B2* | 4/2010 | Zimmerman | G05D 1/0274 |
| | | | | 705/28 |
| 8,429,004 | B2* | 4/2013 | Hamilton | G06Q 10/06 |
| | | | | 705/7.41 |
| 8,688,579 | B1* | 4/2014 | Ethington | G06K 9/4609 |
| | | | | 705/42 |
| 8,762,212 | B2 | 6/2014 | Falls et al. | |

(Continued)

FOREIGN PATENT DOCUMENTS

WO    WO-2007117368 A2 * 10/2007    .......... G06Q 10/087

OTHER PUBLICATIONS

Moorthy, Rahul, et al. "Applying Image Processing for Detecting On-Shelf Availability and Product Positioning in Retail Stores", ACM International Conference Proceeding Series, Aug. 10, 2015. (Year: 2015).*

(Continued)

*Primary Examiner* — Neha Patel
*Assistant Examiner* — Clay C Lee
(74) *Attorney, Agent, or Firm* — Scott Dobson (57) ABSTRACT

Auditing shelf space of an outlet of a retailer using a device comprising: a computer, a camera, a global positioning system receiver and a repository. The device is authenticated using the time and date of the audit, and a location of the audit at the outlet of the retailer. Once the device is authenticated, images of displays within the outlet and audit information relating to the display and the outlet of the retailer are captured and audit information is embedded into the captured image. The captured image is encrypted and sent to a remote computer of a checker company for a compliance check.

15 Claims, 5 Drawing Sheets

(56) References Cited

U.S. PATENT DOCUMENTS

| | | | |
|---|---|---|---|
| 8,917,902 B2* | 12/2014 | Hicks | G06Q 10/0875 |
| | | | 382/100 |
| 9,014,345 B2* | 4/2015 | Barnes | G06F 21/6218 |
| | | | 713/182 |
| 10,692,312 B1* | 6/2020 | Niranjayan | G07C 9/25 |
| 2005/0231354 A1* | 10/2005 | Riedel | A61N 1/39 |
| | | | 340/531 |
| 2008/0082354 A1* | 4/2008 | Hurry | G06Q 30/00 |
| | | | 705/317 |
| 2008/0208719 A1 | 8/2008 | Sharma et al. | |
| 2009/0016534 A1* | 1/2009 | Ortiz Cornet | G06F 21/64 |
| | | | 380/277 |
| 2009/0059270 A1* | 3/2009 | Opalach | G06K 9/00 |
| | | | 358/1.15 |
| 2009/0094140 A1* | 4/2009 | Kwan | G06Q 10/087 |
| | | | 705/28 |
| 2009/0254572 A1* | 10/2009 | Redlich | G06Q 10/06 |
| 2010/0138281 A1 | 6/2010 | Zhang et al. | |
| 2012/0110338 A1* | 5/2012 | Druschel | G06F 21/6218 |
| | | | 726/21 |
| 2015/0279037 A1* | 10/2015 | Griffin | G06F 3/1446 |
| | | | 345/1.3 |
| 2015/0365660 A1* | 12/2015 | Wu | G05D 1/0234 |
| | | | 348/158 |
| 2016/0171707 A1* | 6/2016 | Schwartz | G06K 9/00201 |
| | | | 382/180 |
| 2016/0371998 A1* | 12/2016 | Fazeel | G16H 20/70 |

OTHER PUBLICATIONS

"Space Compliance Audits—Shelfwatch", retrieved from http://www.shelfwatch.com/space-compliance-audits/; as early as Jun. 2015.

"Retail Auditing—Contract People", retrieved from http://contractpeople.com/retail-auditing/; as early as Feb. 2015.

"Mystery Shopping", https://www.esa-retail.co.uk/mystery-shopping; as early as Sep. 2014.

"Retail Audit App | VisitBasis", retrieved from http://www.visitbasis.com/retail-audit-app; as early as Jun. 2015.

"Retail Audit and Store Execution Software for Android and iOS", retrieved from http://store-audit-app.com/; as early as Nov. 2015.

* cited by examiner

DISPLAY AND SHELF SPACE AUDIT SYSTEM

BACKGROUND

The present invention relates to a display and shelf space audit system, and more specifically to a tamper resistant display and shelf space audit system.

To maintain its competitive position in the market and provide consumers with its latest and best offerings, Fast Moving Consumer Goods (FMCG) companies involve all their retailers in a campaign to promote their products and offer discounts. Each retailer provides the floor/shelf space to display posters and place product samples. Retailers are paid by the FMCG companies for the floor and shelf space provided. One of the issues that FMCG companies have is that they do not have any way of monitoring the retailer and the associated shelf space purchased for display posters, hoardings etc., Therefore, FMCG companies are relying on complete compliance by the retailer and manual auditing.

Manual auditing is where third party auditors check the retailer and how the campaign is being displayed. The third party auditing companies frame questionnaires such as "Is the display proper?" "Is it located in a prominent place?" etc. With these questions, auditors go to the retail outlet and monitor the display to be able to provide answers to these questions. The questionnaire may be completed on paper or electronically.

The third party may use the questionnaire to audit the following spaces: floor space, shelf space, poster and hoardings display, and product sample display.

Floor space auditing includes auditing the floor space to validate whether the retailer has provided the agreed floor space for displaying posters, product samples and placing shelves etc.

Shelf space auditing is the auditing of the shelf space to validate whether the retailer has provided the agreed shelf space for displaying products and also monitor that the retailer has kept the agreed products in the display.

Poster and hoardings display auditing is the auditing of the posters and hoardings displayed inside the retail store to validate whether the retailer has displayed the posters properly at the agreed location in the store.

Product sample display auditing is the auditing of the product sample display inside the store to validate whether the retailer has displayed agreed samples in the store. Based on the provided answers, the auditing company decides the score for the outlet of the retailer. Finally, the audit score for the outlet is sent to the FMCG Company for payment of the retailer for the shelf space.

The manual auditing of retailers by third parties can have issues, such as tampering with the audit data prior to the data being sent to FMCG Companies, and misinformation being provided to the FMCG Companies due to an auditor providing false answers or not actually going to the location in question, both of which may lead to problems, as the FMCG company bases further decisions on this data as well as compensation to the retailer.

SUMMARY

According to one embodiment of the present invention, a method of auditing shelf space of an outlet of a retailer using a device comprising: a computer, a camera, a global positioning system receiver and a repository is disclosed. The method comprising the steps of: the computer authenticating the device of an auditor, the time and date of the audit, and a location of the audit at the outlet of the retailer; and when the device is authenticated, the computer: capturing images of displays within the outlet and audit information relating to the display and the outlet of the retailer; embedding the audit information within the captured image and storing the captured image with embedded audit information in the repository; encrypting the captured image with the embedded audit information; and sending the encrypted, captured image and embedded audit information to a remote computer for a compliance check.

According to another embodiment of the present invention, a computer program product for auditing shelf space of an outlet of a retailer using a device comprising: a camera, a global positioning system receiver, a repository and a computer comprising at least one processor, one or more memories, one or more computer readable storage media, the computer program product comprising a computer readable storage medium having program instructions embodied therewith. The program instructions executable by the computer to perform a method comprising: authenticating, by the computer, the device of an auditor, the time and date of the audit, and a location of the audit at the outlet of the retailer; and when the device is authenticated: capturing, by the computer, images of displays within the outlet and audit information relating to the display and the outlet of the retailer; embedding, by the computer, the audit information within the captured image and storing, by the computer, the captured image with embedded audit information in the repository; encrypting, by the computer, the captured image with the embedded audit information; and sending, by the computer, the encrypted, captured image and embedded audit information to a remote computer for a compliance check.

According to another embodiment of the present invention auditing shelf space of an outlet of a retailer using a device comprising: a camera, a global positioning system receiver, a repository and a computer. The computer system comprising a computer comprising at least one processor, one or more memories, one or more computer readable storage media having program instructions executable by the computer to perform the program instructions comprising: authenticating, by the computer, the device of an auditor, the time and date of the audit, and a location of the audit at the outlet of the retailer; and when the device is authenticated: capturing, by the computer, images of displays within the outlet and audit information relating to the display and the outlet of the retailer; embedding, by the computer, the audit information within the captured image and storing, by the computer, the captured image with embedded audit information in the repository; encrypting, by the computer, the captured image with the embedded audit information; and sending, by the computer, the encrypted, captured image and embedded audit information to a remote computer for a compliance check.

DETAILED DESCRIPTION

In an embodiment of the present invention, a hand held or mobile device, with an audit program, is used by auditors to collect the audit data from outlets of the retailers and protect the data from tampering. Data tampering is significantly reduced by using Binary Large Objects (BLOB), integrated GPS receivers, data hashing and a checksum algorithm. The mobile device transfers the audit images and associated data to a company server or remote computer via wireless connections. At the FMCG or checker company, checksum of the audit data is computed and validated. The images received are then compared to template images of the same to determine a score and associated payment to the retailer. A checker company is a company which monitors auditor performance and checks the images capturing the display scheme. The checker company may be the FMCG company or a third party which reports results to the FMCG company.

In an embodiment of the present invention, an audit is conducted automatically and easily using the hand held or mobile device, eliminating the need for third party auditors, since company sales persons can integrate the audit into their sales process. Embodiments of the present invention remove questionnaires from the audit process. The questionnaires are replaced with image capturing of the display scheme or the shelf space etc. By capturing an image of the display scheme or shelf space, tampering of the audit data is prevented.

Furthermore, an embodiment of the present invention permits the FMCG companies or checker company to monitor the auditor performance and check that the auditors are conducting the audit according to the specified schedule/configuration by the FMCG company.

Figure 1:
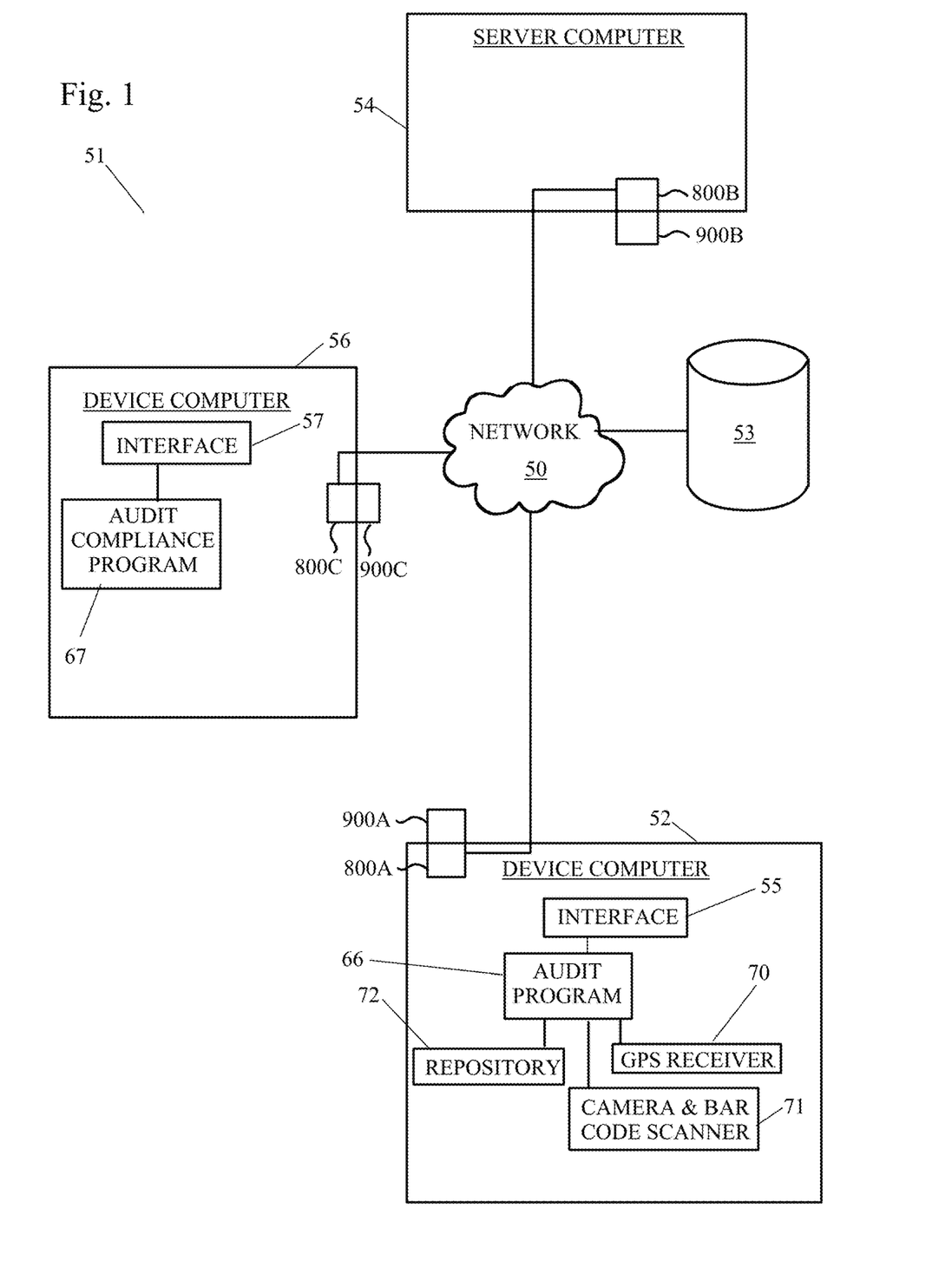
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first device computer 52, a second device computer 56, a repository 53, and a server computer 54 connect to network 50. In other exemplary embodiments, network data processing system 51 may include additional client or device computers, storage devices or repositories, server computers, and other devices not shown.

The first device computer 52 may be a mobile device, hand held device, tablet, or any device with a camera, GPS receiver and network connectivity. The first device computer 52 may contain an interface 55, which may accept commands and data entry from a user. The commands may be regarding capturing displays of the retailer to record or input audit data and entering a user name and password. The interface 55 can be, for example, a command line interface, a graphical user interface (GUI), a natural user interface (NUI) or a touch user interface (TUI). The first device computer 52 preferably includes an audit program 66. The first device computer 52 also preferably includes a GPS receiver 70 and a camera with a barcode scanner 71 for providing input to the audit program 66. Additionally, the first device computer 52 may include a repository 72. While not shown, it may be desirable to have the audit program 66 be present on the server computer 54. The first device computer 52 includes a set of internal components 800a and a set of external components 900a, further illustrated in FIG. 5.

The second device computer 56 may be a personal computer or other computing device. The second device computer 56 may contain an interface 57, which may accept commands and data entry from a user. The commands may be regarding compliance of images and associated audit data with templates or standards for the audit data. The interface 57 can be, for example, a command line interface, a graphical user interface (GUI), a natural user interface (NUI) or a touch user interface (TUI). The second device computer 56 preferably includes an audit compliance program 67. While not shown, it may be desirable to have the audit compliance program 67 be present on the server computer 54. The second device computer 56 includes a set of internal components 800c and a set of external components 900c, further illustrated in FIG. 5.

Figure 5:
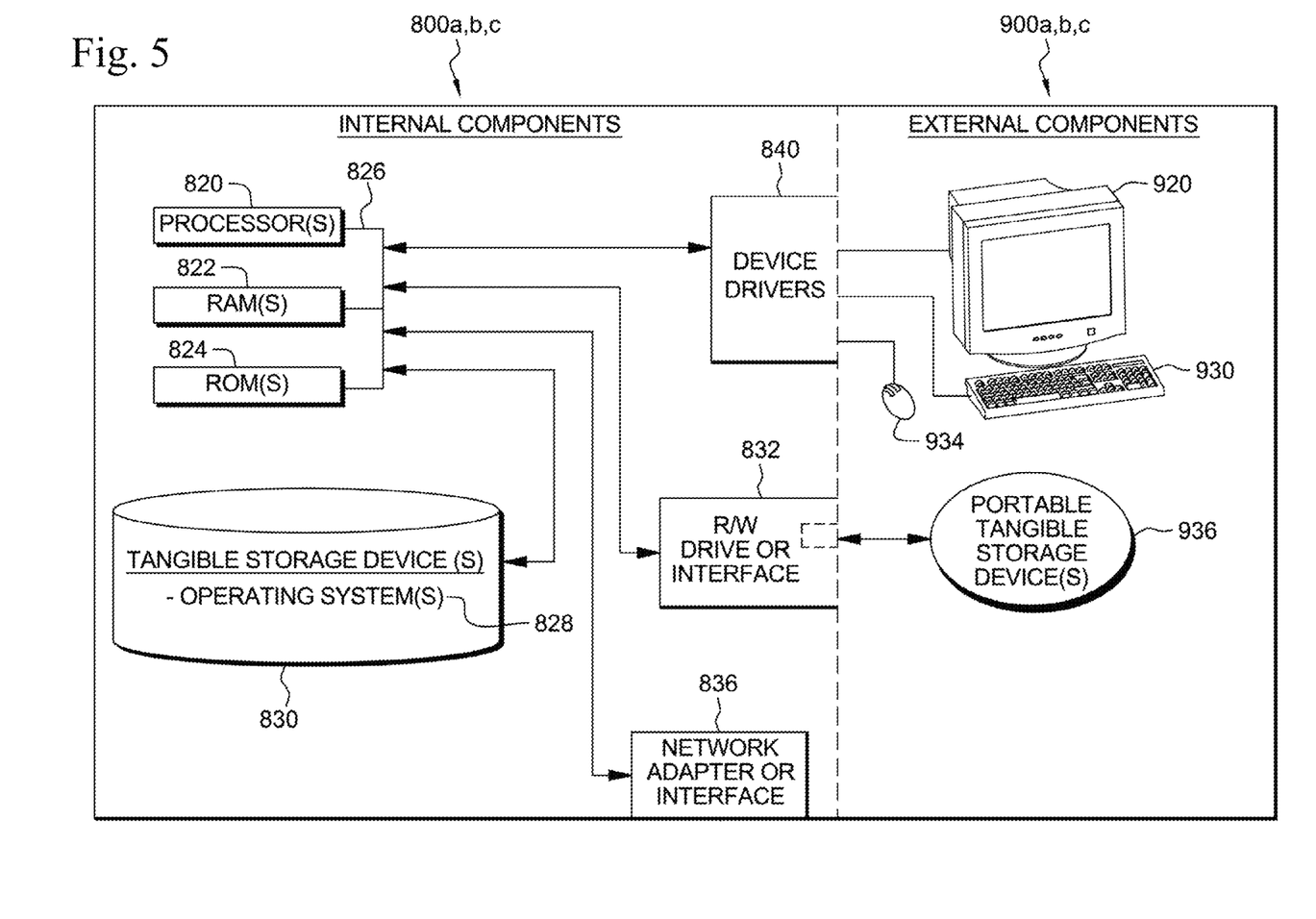
FIG. 5 depicts an exemplary diagram of a possible data processing environment in which illustrative embodiments may be implemented.

Server computer 54 includes a set of internal components 800b and a set of external components 900b illustrated in FIG. 5. In the depicted example, server computer 54 provides information, such as boot files, operating system images, and applications to the device computer 52. Server computer 54 can compute the information locally or extract the information from other computers on network 50. The server computer 54 may contain the audit compliance program 67 and the audit program 66.

Program code and programs such as audit program 66 and the audit compliance program 67 may be stored on at least one of one or more computer-readable tangible storage devices 830 shown in FIG. 5, on at least one of one or more portable computer-readable tangible storage devices 936 as shown in FIG. 5, or on storage unit 53 connected to network 50, or may be downloaded to a first device computer 52, a second device computer 56, or a server computer 54, for use. For example, program code and programs such as audit program 66 and the audit compliance program 67 may be stored on at least one of one or more storage devices 830 on server computer 54 and downloaded to a first device computer 52 and/or a second device computer 56 over network 50 for use. Alternatively, server computer 54 can be a web server, and the program code, and programs such as audit program 66 and the audit compliance program 67 may be stored on at least one of the one or more storage devices 830 on server computer 54 and accessed by the first device computer 52 and/or the second device computer 56. In other exemplary embodiments, the program code, and programs such as audit program 66 and the audit compliance program 67 may be stored on at least one of one or more computer-readable storage devices 830 on the first device computer 52, on the second device computer 56 or distributed between two or more servers.

In one embodiment, when the audit compliance program 67 is stored in the first device computer 52, checking of images can occur in real time on the first device computer 52 itself instead of sending the image to a server computer 54 to verify the image. The determination of whether the image is verified can then only be sent to server computer 54.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
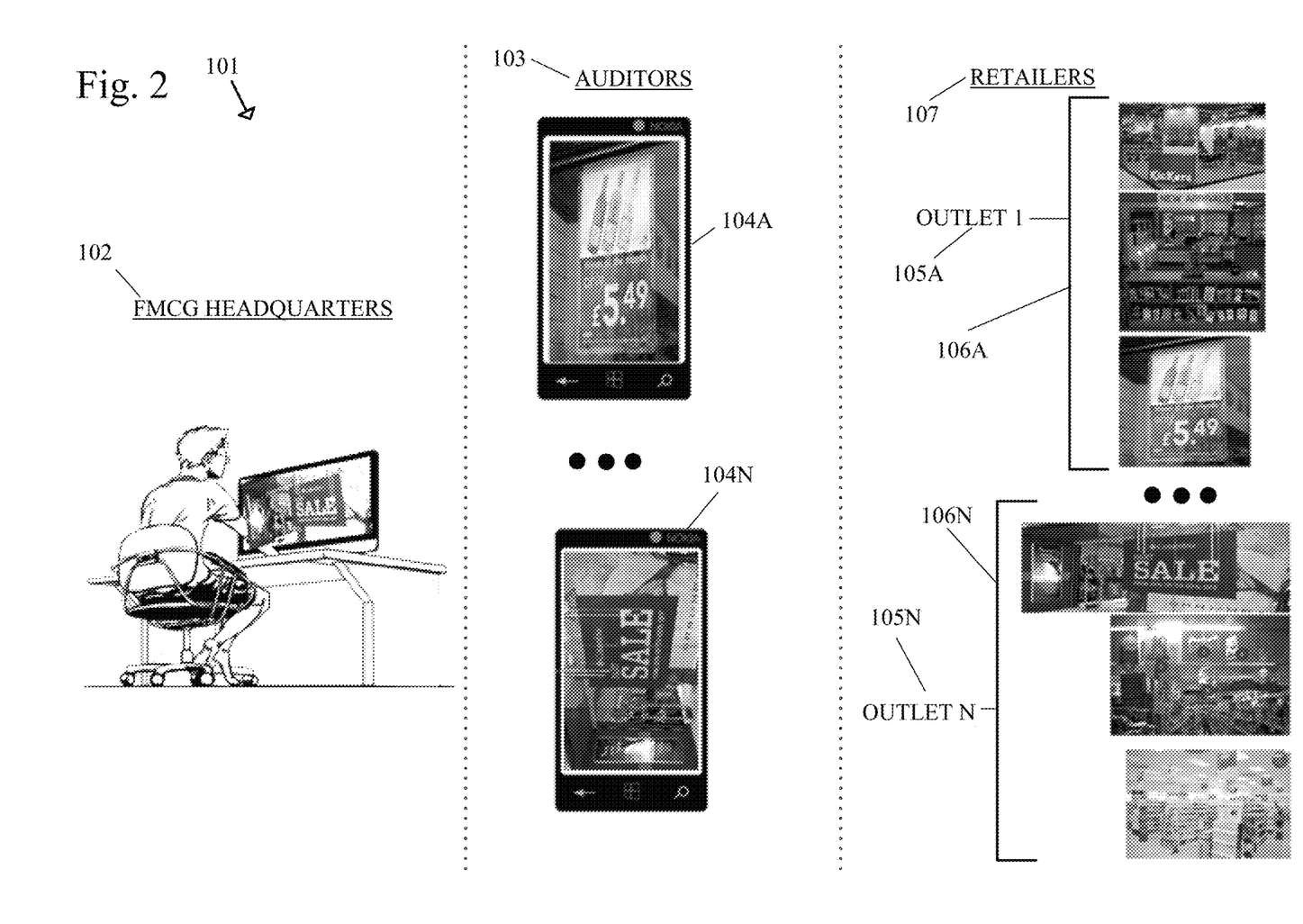
FIG. 2 shows a schematic of an overview of the audit system.

FIG. 2 shows a schematic of an overview of an audit system.

The audit system 101 of the present embodiment consists of second device computers 56, server computers 54 of the FMCG company 102, mobile devices 104a-104n used by the auditors 103 and outlets 105a-105n at different locations of the retailers 107 that are paid to display campaigns in space at the outlets 105a-105n. The audit system 101 permits auditors 103 to audit the floor and shelf space, display posters and hoardings, and product sample displays at the outlets 105a-105n, using a hand held or mobile device 104a-104n that is running an application, such as audit program 66. The auditors 103 hold the mobile device 104a-104n, capture images 106a-106n of the audited items at the outlets 105a-105n, for example through camera 71, and run the audit program 66. The auditors 103 could be part of a sales team visiting their respective outlets 105a-105n and do the auditing as part of their sales process (Order Booking, Stock Taking, Replenishment, damages etc.), since the audit is conducted automatically and easily using this mobile device 104a-104n eliminating the need for third party auditors.

The mobile devices 104a-104n may be the first device computer 52 and preferably contains a processor 820, storage 830 or repository 72, camera 71, a GPS receiver 70, and audit program 66. The audit program 66 is by default locked, and the audit program 66 is unlocked only through the compatible location information, as captured by the GPS receiver 71, which corresponds with GPS coordinates as provided by the FMCG company 102, as well as compatible audit date/time as per the audit schedule/configuration assigned by the company, which may be preloaded onto the mobile device 104a-104n.

The audit program 66 of the mobile device 104a-104n preferably permits: user authentication, capturing of images, barcode scanning, determination of location of the device, storing of images captured as BLOB objects, encryption, tagging of images using hashing and checksum algorithm to calculate a checksum with a timestamp, an outlet ID, a display ID, and a user ID, which are assigned by the FMCG company. The outlet ID is a unique identification given to each outlet of a retailer engaged with the FMCG company. The display ID is a unique identification given to each display within an outlet of the retailer. The user ID is a unique identification given to each auditor engaged by the FMCG company.

The mobile device 104a-104n can also send any of the audit information collected with the associated images to the FMCG company through the network 50.

A server computer 54, 102 of the FMCG company may receive the audit information collected with the associated images. The associated images may be encrypted. The data may be stored within repository 53. The audit information may be decrypted by a server computer 54 and may be accessed by a device computer 56 with an audit compliance program 67. Alternatively, the audit compliance program 67 may be present on the server computer 54. The audit compliance program 67 runs an image comparison and does a checksum comparison to extract embedded audit information in the images, for example, outlet ID, display ID, user ID, and timestamp. The audit compliance program 67 calculates a total audit score for the outlet to assess the performance of the auditors and outlets of the retailers. Based on the score, the FMCG company provides payment to the retailer for each outlet.

It should be noted that the FMCG company assigns visits to the outlets of the retailers for the auditors and the visits are known by the mobile devices 104a-104n. It should also be noted that, prior to the audit visit and preferably at the time of setup, the FMCG company assigns each outlet with an ID and determines GPS coordinates for the outlet, as well as placing a barcode on each shelf space and display posters etc. Each barcode will contain the Display ID and the Outlet ID.

Figure 3:
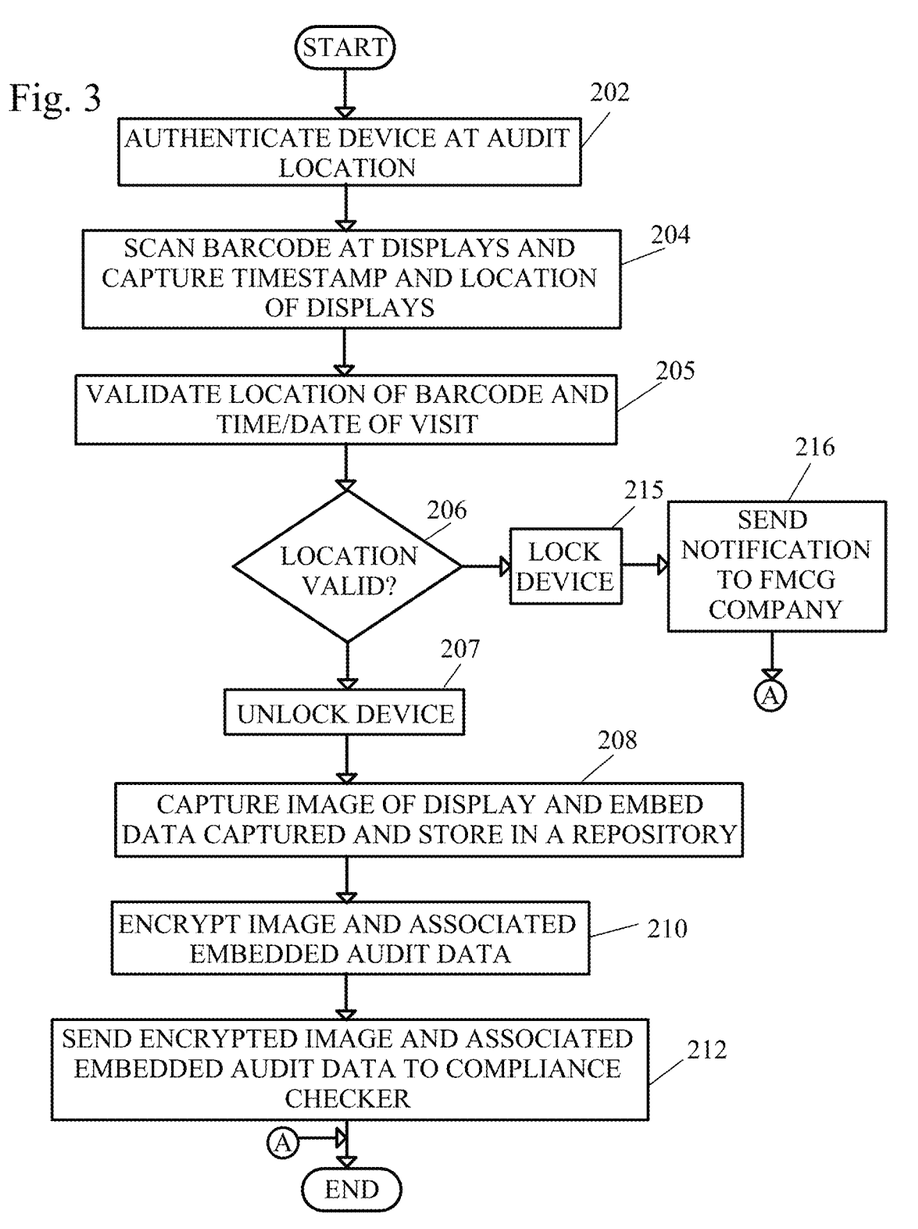
FIG. 3 shows a flow diagram of a method of capturing auditing data.

FIG. 3 shows a flow diagram of a method of capturing auditing data.

In a first step, the audit program 66 authenticates the device at the outlet of the retailer (step 202). The authentication may include the entry of a user ID and password by the auditor. The location of the device may also be validated using its current location at the outlet of the retailer through the GPS receiver 70.

The audit program 66 scans barcodes at the displays and captures timestamp and location of the displays at the outlets (step 204). The location of the displays may be captured using the GPS receiver 70 of the devices 104a-104n.

The audit program 66 validates the location of the display relative to the location of the outlet of the retailer and the time and date of the visit to the outlet of the retailer for audit (step 205). The validation of the location and the time and date of the visit may be verified with the FCMG company or may be compared to a stored schedule and location stored in the mobile device 104a-104n.

If the location of the display relative to the location of the outlet of the retailer and the time and date of the audit is invalid (step 206), the mobile device 104a-104n is locked (step 215) and a notification may be sent to the FCMG company (step 216) and the method ends.

If the location of the display relative to the location of the outlet of the retailer and the time and date of the audit is valid (step 206), the mobile device 104a-104n is unlocked to continue the rest of the audit (step 207).

The audit program 66 captures images of the displays, embeds audit data within the image, and stores the image in a repository of the mobile device 104a-104n (step 208). The embedded audit data may include, but is not limited to GPS coordinates of the display within the outlet of the retailer, User ID, Display ID, Outlet ID and Time Stamp. The images with the embedded audit data may be stored within the repository 72, 830 of the mobile device 104a-104n as Binary Large Object (BLOB) objects, which prevents tampering with the images prior to the images being sent to the FMCG company 102.

The audit program 66 encrypts the images and associated embedded audit data (step 210). The encryption may include tagging the images based on hashing and a checksum algorithm. The audit program calculates Checksum with Outlet ID, Display ID, User ID and Timestamp.

The audit program 66 sends the encrypted, tagged images to the FCMG company (step 212) and the method ends. The encrypted, tagged images may be sent once the entire audit of an outlet of the retailer is complete or as the images are taken.

It should be noted that information transferred with embedded images to the FMCG company may also include information related to the auditors who took the images and the time the images were taken by the auditors. This information can be used by FMCG to assess the performance of the auditors compared to the outlet visit schedules/configurations assigned to them.

Figure 4:
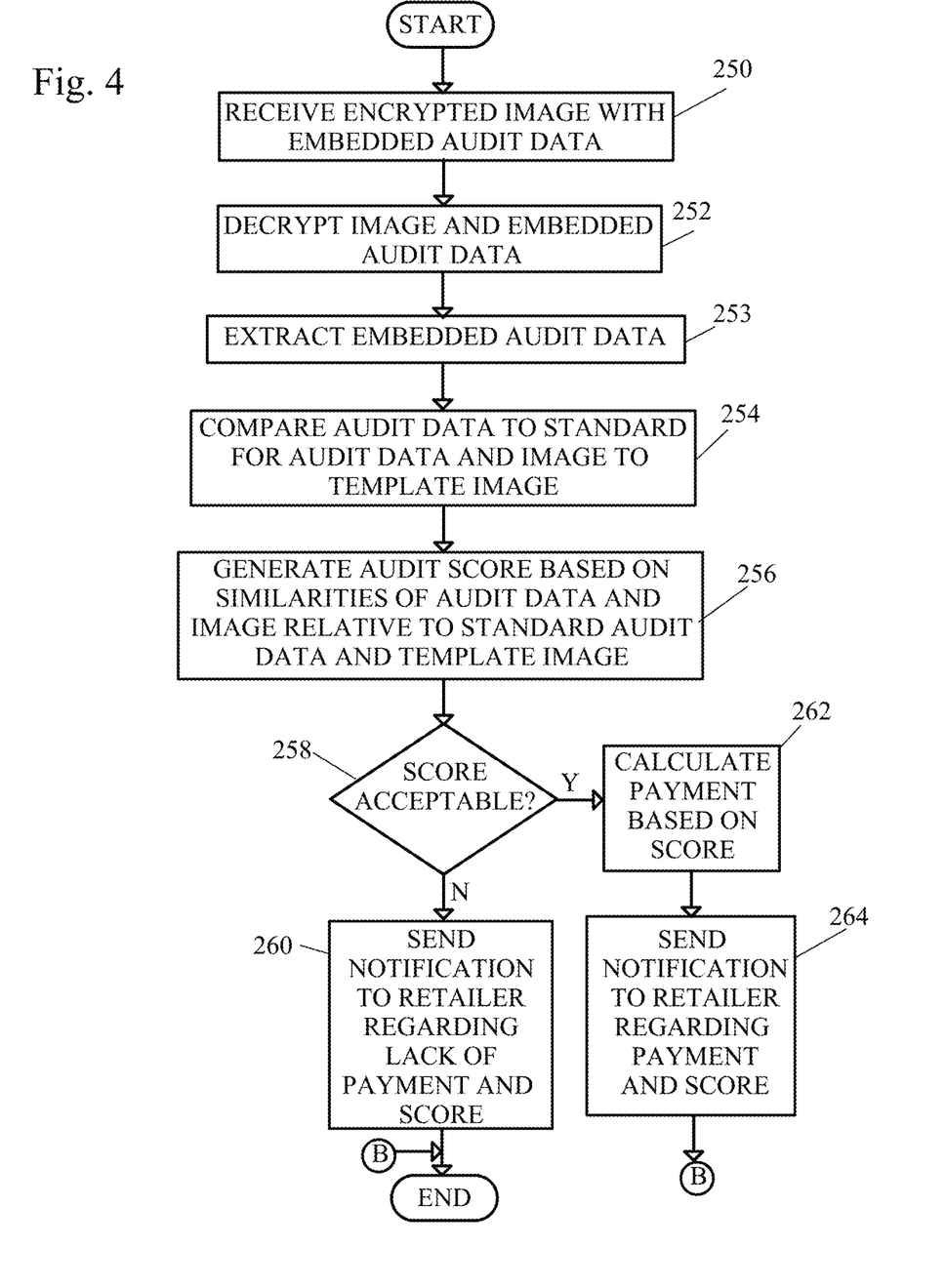
FIG. 4 shows a flow diagram of a method of comparing auditing data to templates for accuracy.

FIG. 4 shows a flow diagram of a method of comparing auditing data to templates for accuracy.

In a first step, the audit compliance program 67 receives encrypted images with embedded audit data (step 250).

The encrypted images are decrypted using a key corresponding to the hash of the encrypted image (step 252). As part of the decryption process, a checksum comparison may be conducted to determine whether the auditor used the same image from another outlet at a different location of the retailer.

It should be noted that other methods of encryption and decryption may also be used in regards to sending the audit information and preventing tampering of the information.

Embedded audit data is extracted (step 253). The embedded audit data may include, but is not limited to the Outlet ID, User ID, and Display ID information together with the time stamp embedded in each image.

The extracted audit data and the images of the display is compared to the standard associated audit data and template images of the display (step 254). The comparison may be conducted by the audit compliance program 67 or manually by a user.

The audit compliance program 67 generates an audit score based on the similarities between the associated audit data and images of the displays relative to the standard audit data and template images of the display (step 256).

If the audit score generated is acceptable (step 258), payment is calculated by the audit compliance program 67 to the retailer based on the score (step 262) and a notification is sent to the retailer regarding the payment and score for the outlet (step 264) and the method ends. The amount of payment may be based on a tier or range of scores.

If the audit score generated is not acceptable (step 258), a notification is sent to the retailer regarding lack of payment and audit score (step 260) and the methods ends. The notification may also include information regarding how to fix the displays to increase the audit score for a future audit and subsequent payment.

FIG. 5 illustrates internal and external components of a first device computer 52, a second device computer 56 and server computer 54 in which illustrative embodiments may be implemented. In FIG. 5, a first device computer 52, a second device computer 56, and a server computer 54 include respective sets of internal components 800a, 800b, 800c and external components 900a, 900b, 900c. Each of the sets of internal components 800a, 800b, 800c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the audit program 66 and the audit compliance program 67 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b, 800c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Audit program 66 and the audit compliance program 67 can be stored on one or more of the portable computer-readable tangible storage devices 936, read via R/W drive or interface 832 and loaded into hard drive 830.

Each set of internal components 800a, 800b, 800c also includes a network adapter or interface 836 such as a TCP/IP adapter card. Audit program 66 and the audit compliance program 67 can be downloaded to the first device computer 52, a second device computer 56, and server computer 54 from an external computer via a network (for example, the Internet, a local area network or other, wide area network) and network adapter or interface 836. From the network adapter or interface 836, audit program 66 and the audit compliance program 67 is loaded into hard drive 830. Audit program 66 and the audit compliance program 67 can be downloaded to the server computer 54 from an external computer via a network (for example, the Internet, a local area network or other, wide area network) and network adapter or interface 836. From the network adapter or interface 836, audit program 66 and the audit compliance program 67 is loaded into hard drive 830. The network may comprise copper wires, optical fibers, wireless transmission, routers, firewalls, switches, gateway computers and/or edge servers.

Each of the sets of external components 900a, 900b, 900c includes a computer display monitor 920, a keyboard 930, and a computer mouse 934. Each of the sets of internal components 800a, 800b, 800c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Audit program 66 and the audit compliance program 67 can be written in various programming languages including low-level, high-level, object-oriented or non object-oriented languages. Alternatively, the functions of an audit program 66 and the audit compliance program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of auditing shelf space of an outlet of a retailer using a system comprising: an encryption computer at a first location, a decryption computer at a second location, a camera, a global positioning system receiver and a repository, the method comprising:
   authenticating by receiving a user ID and password from an auditor;
   scanning a barcode at a display;
   in response to scanning the barcode:
      identifying a location of the display using GPS coordinates of the global positioning system receiver; and
      capturing a timestamp;
   comparing the location of the display to the location of the outlet of the retailer and the timestamp to a scheduled time and date of an audit;
   unlocking an audit program on the encryption computer in response to the location of the display matching the location of the outlet of the retailer and the timestamp matching the scheduled time and date of the audit;

capturing, by the unlocked audit program, images of displays within the outlet and an audit information relating to a display and the outlet of the retailer;

embedding, by the unlocked audit program, the audit information within the captured image and storing the captured image with embedded audit information in the repository;

encrypting, by the unlocked audit program, the captured image and the embedded audit information;

tagging, after the encryption process, the captured image based on a hashing and a checksum system that calculates a checksum with an outlet identification, a display identification, a user identification, and a timestamp; and sending the encrypted, tagged, captured image and embedded audit information to the decryption computer for a compliance check.

2. The method of claim 1, wherein the audit information captured is selected from the group consisting of: an audit user identification, a display identification, an outlet identification, and a timestamp.

3. The method of claim 1, wherein the captured image with the embedded audit information is stored as a binary large object to prevent tampering with the captured image prior to the captured image being sent to a company.

4. The method of claim 1, wherein the audit information comprises information regarding the auditor capturing the images at the outlet of the retailer.

5. The method of claim 1, further comprising the decryption computer:

receiving the encrypted, captured image with the embedded audit data;

decrypting the encrypted, captured image with the embedded audit data;

extracting the embedded audit data;

comparing the embedded audit data to a standard of an audit data set by a checker company and the captured image to a template image set by the checker company;

generating an audit score representative of an amount of similarity between the standard audit data and the template image relative to the audit data and the captured image received from the outlet of the retailer;

determining the audit score is within an acceptable tier of scores based upon the amount of similarity between the standard audit data, the template image relative to the audit data and the captured image necessary for the outlet of the retailer to show compliance; and calculating payment of the checker company to the retailer corresponding to the determined tier of scores and sending a notification to the retailer regarding the determined tier of scores and the payment corresponding to the determined tier.

6. A computer program product for auditing shelf space of an outlet of a retailer using a system comprising: a camera, a global positioning system receiver, a repository, an encryption computer at a first location, and a decryption computer at a second location comprising at least one processor, one or more memories, one or more computer readable storage media, the computer program product comprising a computer readable storage medium having program instructions embodied therewith, the program instructions executable by the computer to perform a method comprising:

authenticating by receiving a user ID and password from an auditor;

scanning a barcode at a display;

in response to scanning the barcode:
identifying a location of the display using GPS coordinates of the global positioning system receiver; and
capturing a timestamp;

comparing the location of the display to the location of the outlet of the retailer and the timestamp to a scheduled time and date of an audit;

in response to the location of the display matching the location of the outlet of the retailer and the timestamp matching the scheduled time and date of the audit, unlocking an audit program on the encryption computer;

capturing, by the unlocked audit program, images of displays within the outlet and an audit information relating to a display and the outlet of the retailer;

embedding, by the unlocked audit program, the audit information within the captured image and storing, by the encryption computer, the captured image with embedded audit information in the repository;

encrypting, by the unlocked audit program, the captured image and the embedded audit information;

tagging, after the encryption process, the captured image based on a hashing and a checksum system that calculates a checksum with an outlet identification, a display identification, a user identification, and a timestamp; and sending, by the unlocked audit program, the encrypted, tagged, captured image and embedded audit information to the decryption computer for a compliance check; and in response to the location of the display not matching the location of the retailer or the timestamp not matching the scheduled time and date of the audit, locking the audit program and sending a notification.

7. The computer program product of claim 6, wherein the audit information captured is selected from the group consisting of: an audit user identification, a display identification, an outlet identification, and a timestamp.

8. The computer program product of claim 6, wherein the captured image with the embedded audit information is stored as a binary large object to prevent tampering with the captured image prior to the captured image being sent to a company.

9. The computer program product of claim 6, wherein the audit information comprises information regarding the auditor capturing the images at the outlet of the retailer.

10. The computer program product of claim 6, wherein the method further comprises:

receiving, by the decryption computer, the encrypted, captured image with an embedded audit data;

decrypting, by the decryption computer, the encrypted, captured image with the embedded audit data;

extracting, by the decryption computer, the embedded audit data;

comparing, by the decryption computer, an audit data to a standard of audit data set by a checker company and the captured image to a template image set by the checker company;

generating, by the decryption computer, an audit score representative of an amount of similarity between the standard audit data and the template image relative to the audit data and the captured image received from the outlet of the retailer;

determining, by the decryption computer, the audit score is within an acceptable tier of scores based upon the amount of similarity between the standard audit data, the template image relative to the audit data and the captured image necessary for the outlet of the retailer to show compliance; and calculating, by the decryption computer, payment of the checker company to the retailer corresponding to the determined tier of scores and sending a notification to the retailer regarding the determined tier of scores and the payment corresponding to the determined tier.

11. A computer system for auditing shelf space of an outlet of a retailer using a system comprising: a camera, a global positioning system receiver, a repository, an encryption computer at a first location, and a decryption computer at a second location; the computer system comprising a computer comprising at least one processor, one or more memories, one or more computer readable storage media having program instructions executable by the computer to perform the program instructions comprising:

authenticating by receiving a user ID and password from an auditor;

scanning a barcode at a display;

in response to scanning the barcode:
    identifying a location of the display using GPS coordinates of the global positioning system receiver; and
    capturing a timestamp;

comparing the location of the display to the location of the outlet of the retailer and the timestamp to a scheduled time and date of an audit;

in response to the location of the display matching the location of the outlet of the retailer and the timestamp matching the scheduled time and date of the audit, unlocking an audit program on the encryption computer;

capturing, by the unlocked audit program, images of displays within the outlet and an audit information relating to a display and the outlet of the retailer;

embedding, by the unlocked audit program, the audit information within the captured image and storing, by the encryption computer, the captured image with embedded audit information in the repository;

encrypting, by the unlocked audit program, the captured image and the embedded audit information;

tagging, after the encryption process, the captured image based on a hashing and a checksum system that calculates a checksum with an outlet identification, a display identification, a user identification, and a timestamp; and sending, by the unlocked audit program, the encrypted, tagged, captured image and embedded audit information to the decryption computer for a compliance check; and in response to the location of the display not matching the location of the retailer or the timestamp not matching the scheduled time and date of the audit, locking the audit program and sending a notification.

12. The computer system of claim 11, wherein the audit information captured is selected from the group consisting of: an audit user identification, a display identification, an outlet identification, and a timestamp.

13. The computer system of claim 11, wherein the captured image with the embedded audit information is stored as a binary large object to prevent tampering with the captured image prior to the captured image being sent to a company.

14. The computer system of claim 11, wherein the audit information comprises information regarding the auditor capturing the images at the outlet of the retailer.

15. The system of claim 11, wherein the program instructions further comprise:

receiving, by the decryption computer, the encrypted, captured image with an embedded audit data;

decrypting, by the decryption computer, the encrypted, captured image with the embedded audit data;

extracting, by the decryption computer, the embedded audit data;

comparing, by the decryption computer, an audit data to a standard of audit data set by a checker company and the captured image to a template image set by the checker company;

generating, by the decryption computer, an audit score representative of an amount of similarity between the standard audit data and the template image relative to the audit data and the captured image received from the outlet of the retailer;

determining, by the decryption computer, the audit score is within an acceptable tier of scores based upon the amount of similarity between the standard audit data, the template image relative to the audit data and the captured image necessary for the outlet of the retailer to show compliance; and calculating, by the decryption computer, payment of the checker company to the retailer corresponding to the determined tier of scores and sending a notification to the retailer regarding the determined tier of scores and the payment corresponding to the determined tier.

* * * * *